350-269.

08-31-71    OR    3,602,579

[11] 3,602,579

| [72] | Inventor | Ernest Wilbur Silvertooth |
| | | Pasadena, Calif. |
| [21] | Appl. No. | 877,180 |
| [22] | Filed | Nov. 17, 1969 |
| [45] | Patented | Aug. 31, 1971 |
| [73] | Assignee | Film Editing Equipment Corp. |
| | | Hollywood, Calif. |

[54] ELECTROMECHANICAL LIGHT VALVE SYSTEM
17 Claims, 24 Drawing Figs.
[52] U.S. Cl. ................................................ 350/269,
355/36
[51] Int. Cl. ...................................................... G02f 1/30
[50] Field of Search ............................................. 250/214;
350/269; 355/34, 35, 36

[56] References Cited
UNITED STATES PATENTS
| 3,420,347 | 1/1969 | Bales ........................ | 192/142 |
| 3,476,477 | 11/1969 | Balint ....................... | 355/35 |

*Primary Examiner*—Ronald L. Wibert
*Assistant Examiner*—Orville B. Chew, II
*Attorney*—Huebner and Worrel ABSTRACT: This invention embodies an electromechanical device associated with and coacting between an electronic memory storage system containing predetermined light intensity settings in code, and a novel light valve capable of modulating in minute increments the output of light derived from a light source, wherein the electromechanical device controls and actuates the light valve and is controlled, and corrected when required, by the memory storage system, in time increments of far lesser magnitude than previously attainable. The invention has particular utility as a component in a conventional motion picture film additive color printer.

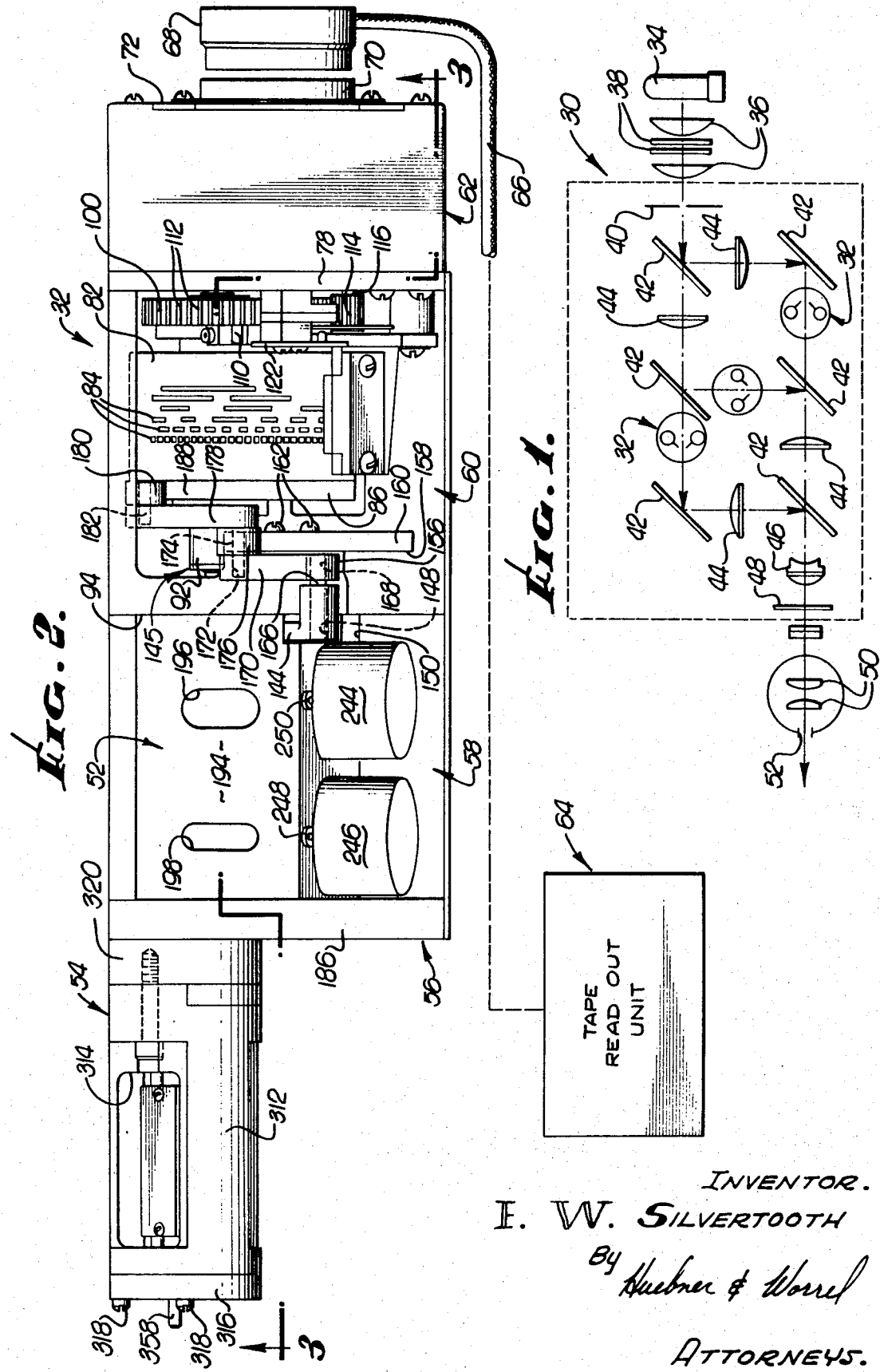

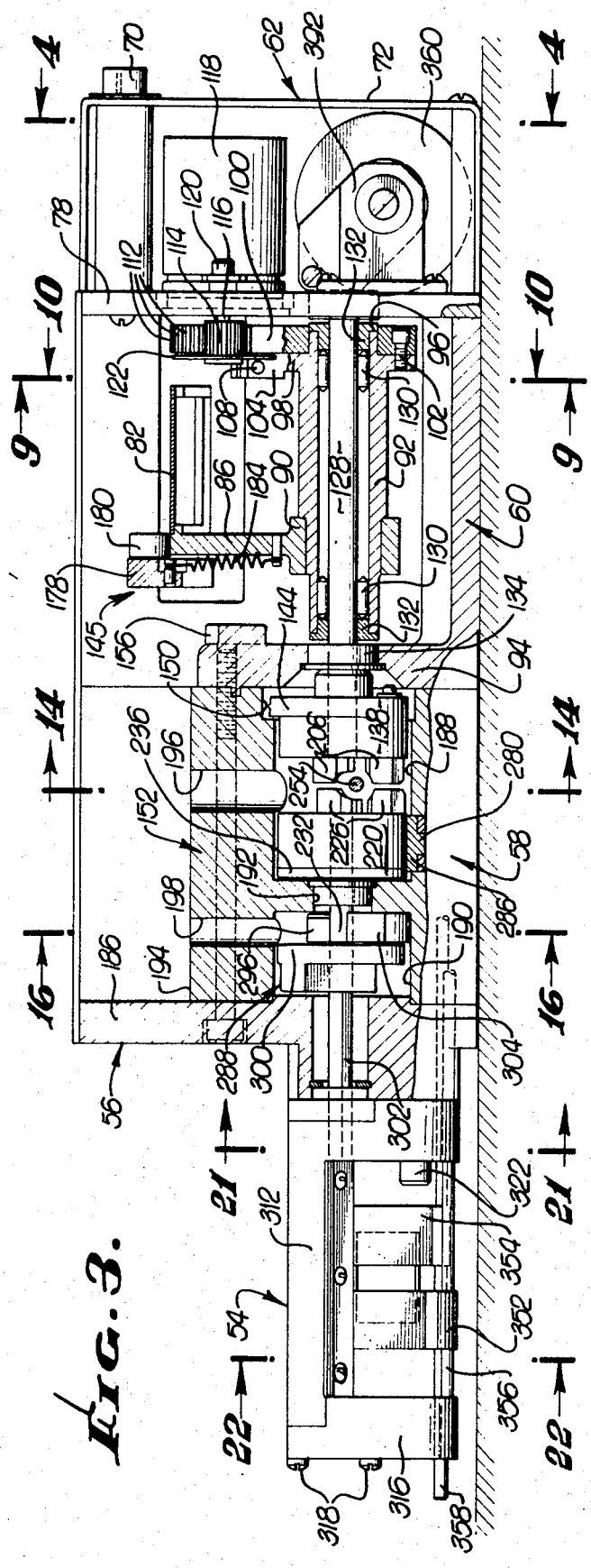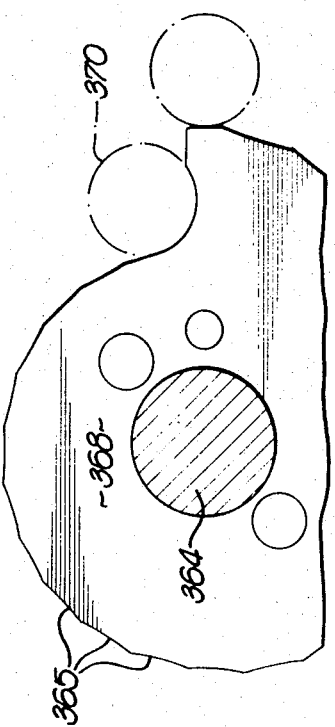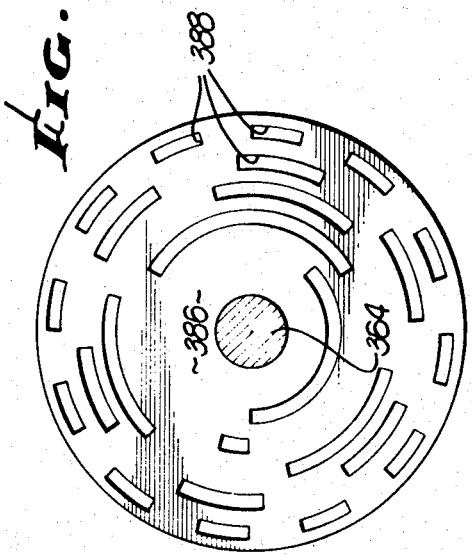

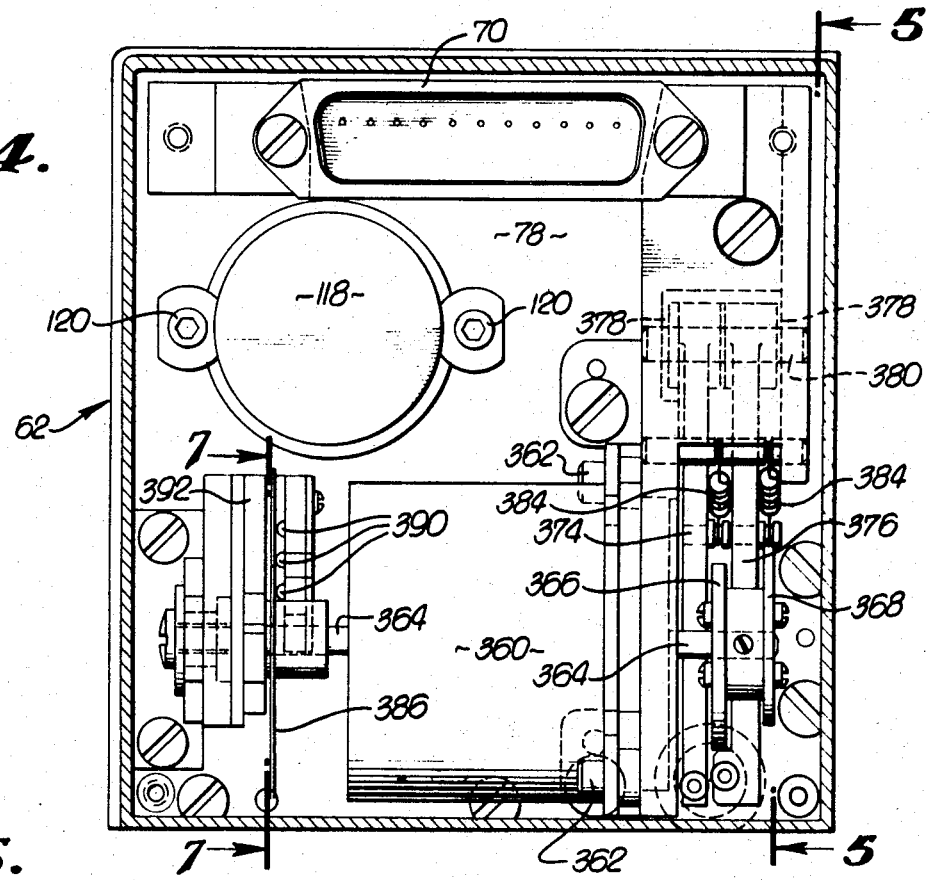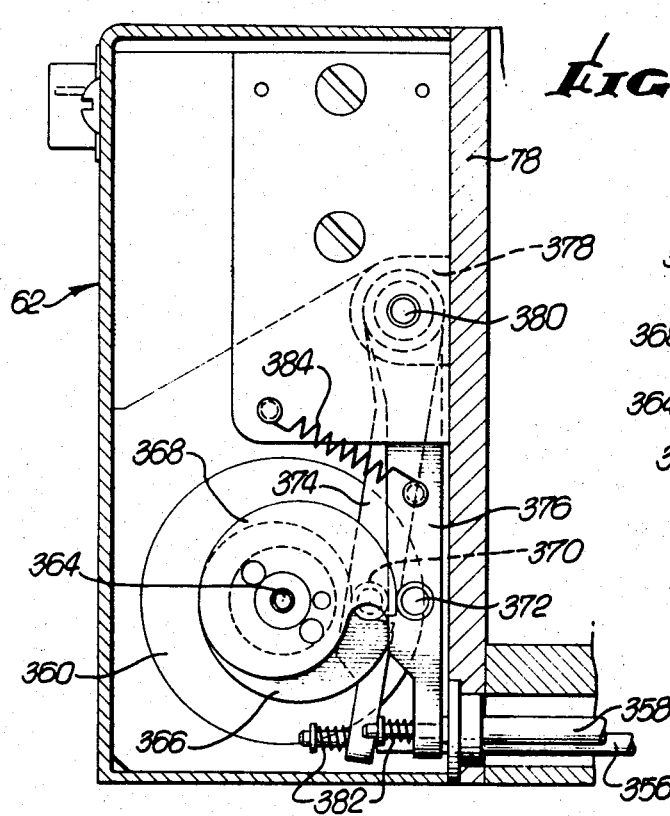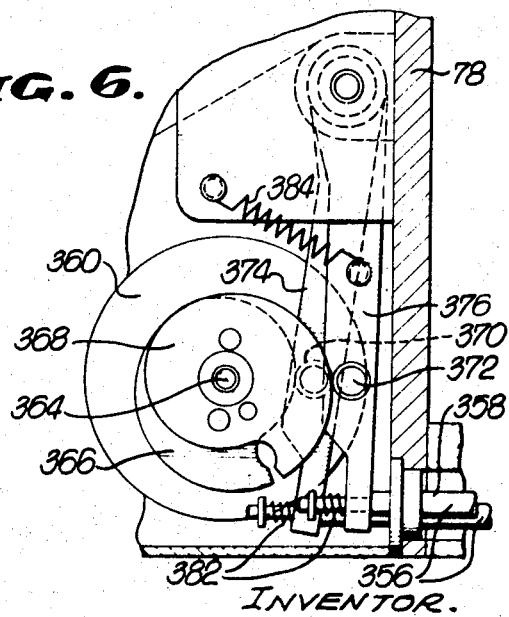

INVENTOR.
F. W. SILVERTOOTH
By Huebner & Worrel
ATTORNEYS.

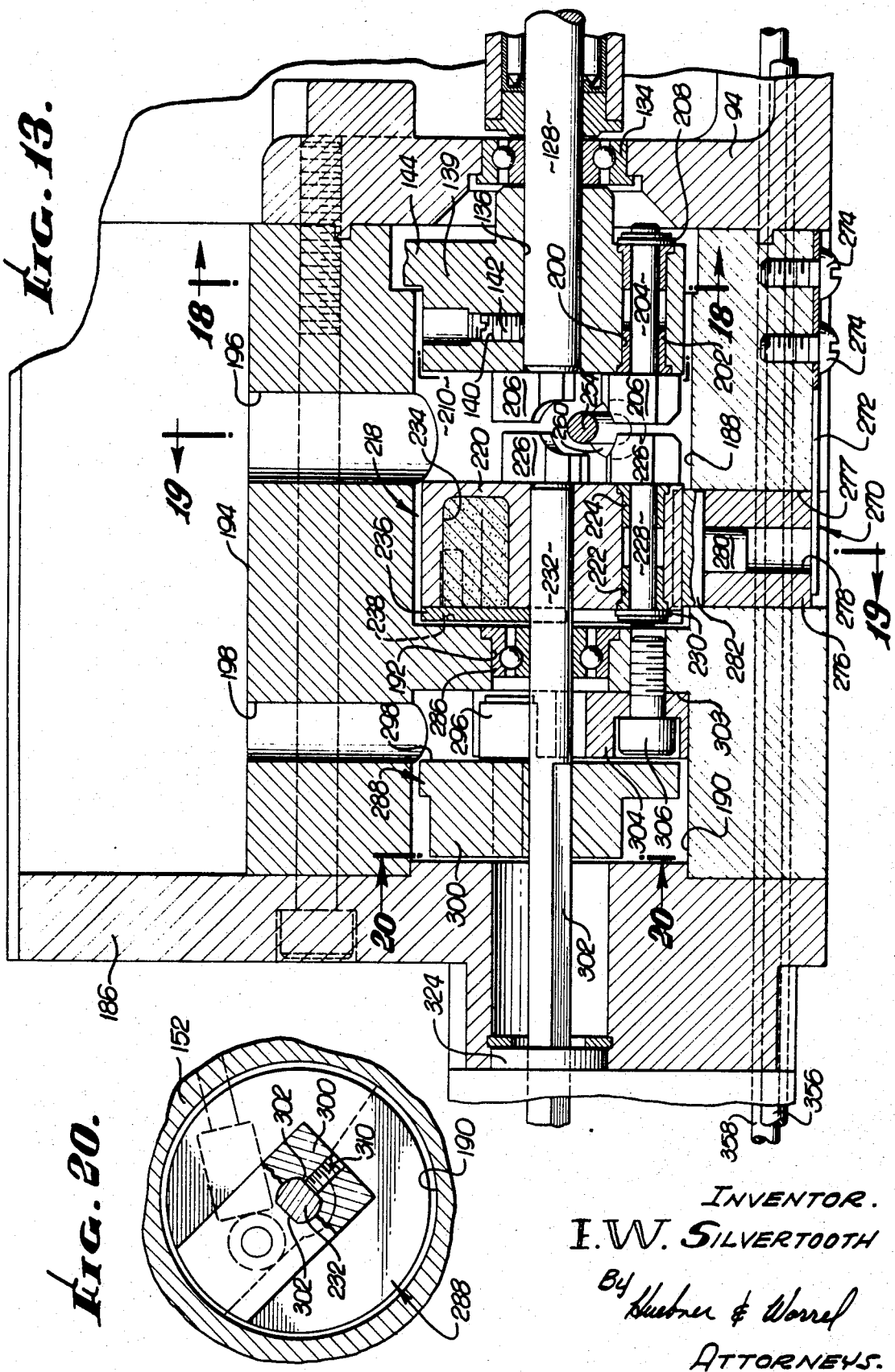

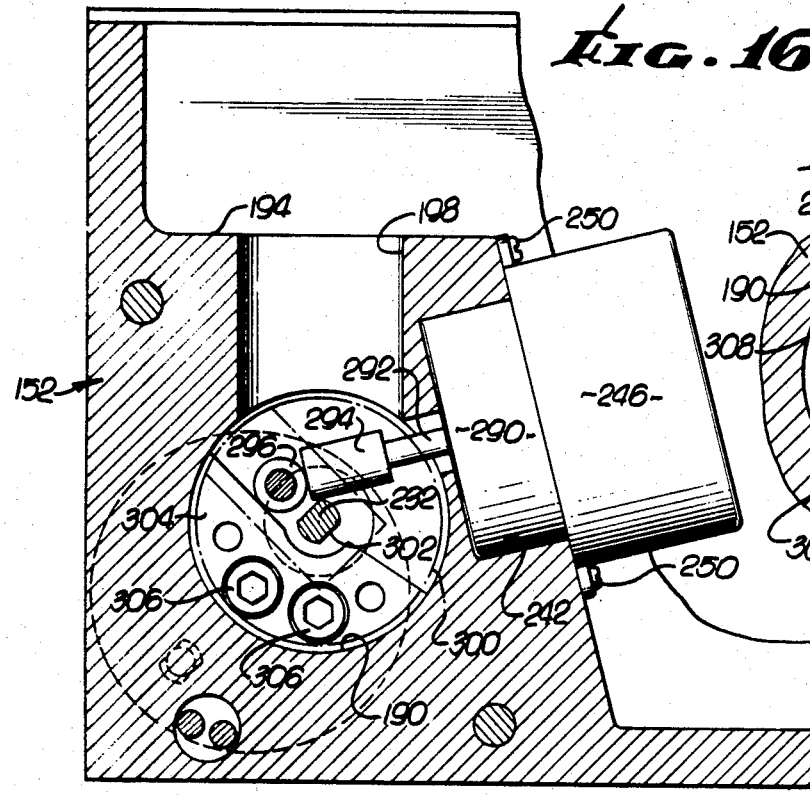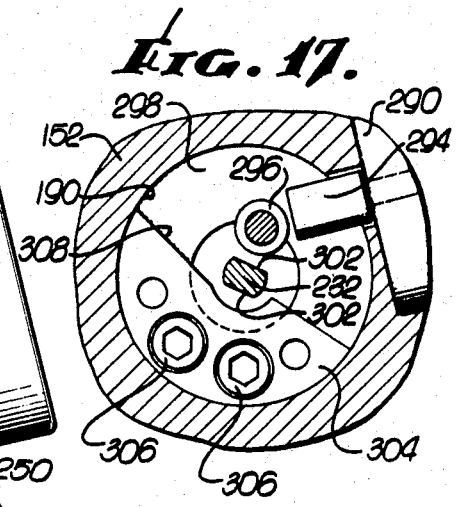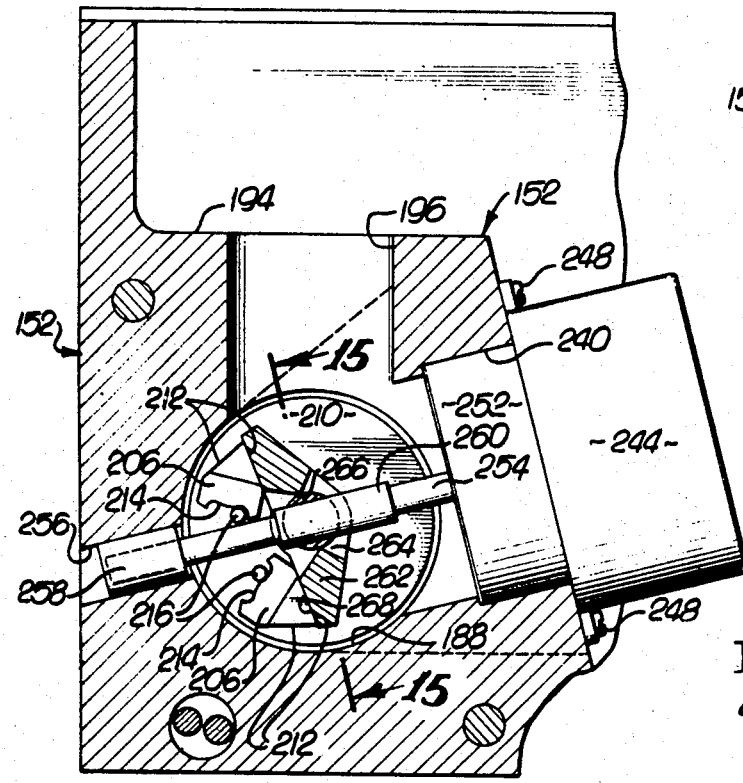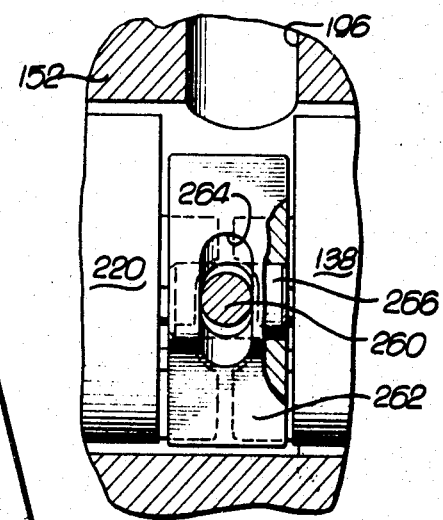

INVENTOR.
E. W. SILVERTOOTH
BY
Huebner & Worrel
ATTORNEYS.

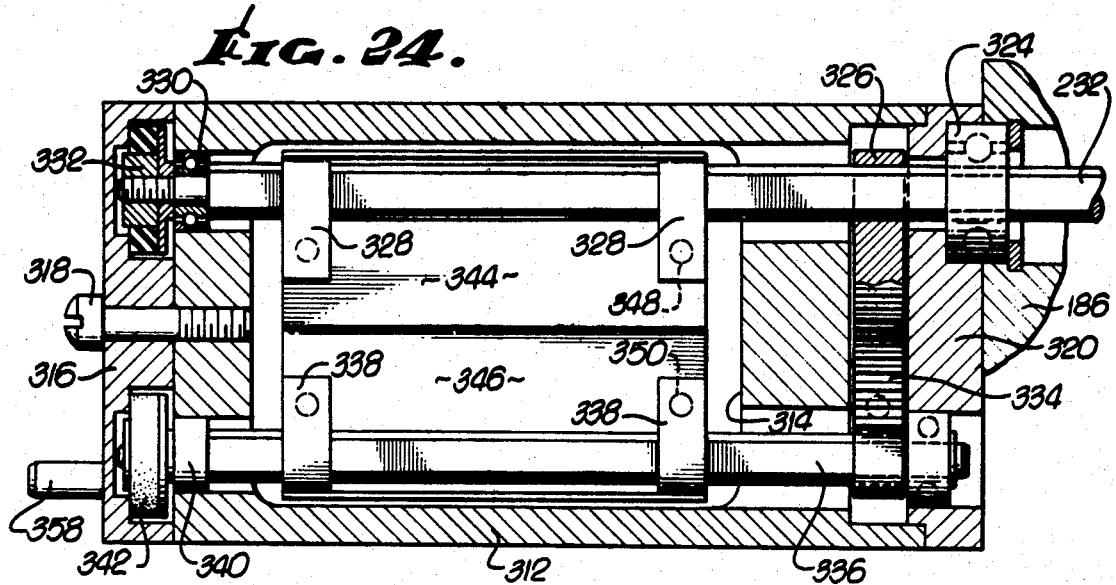
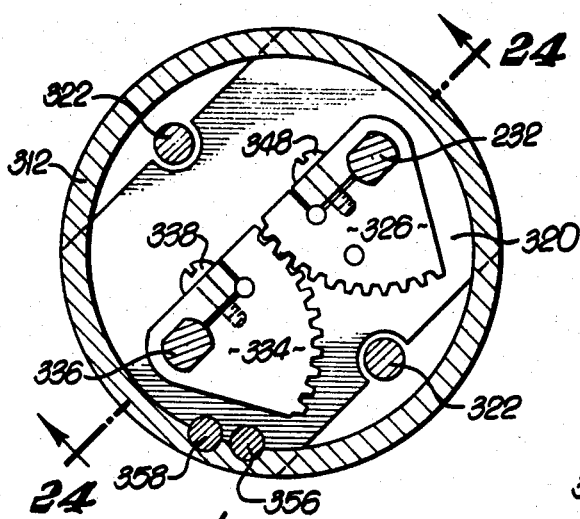
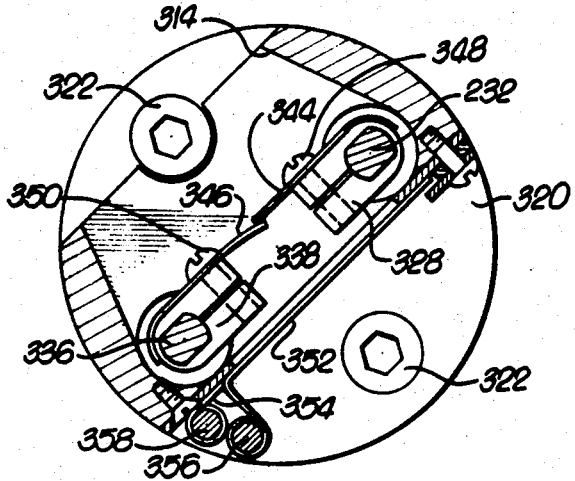
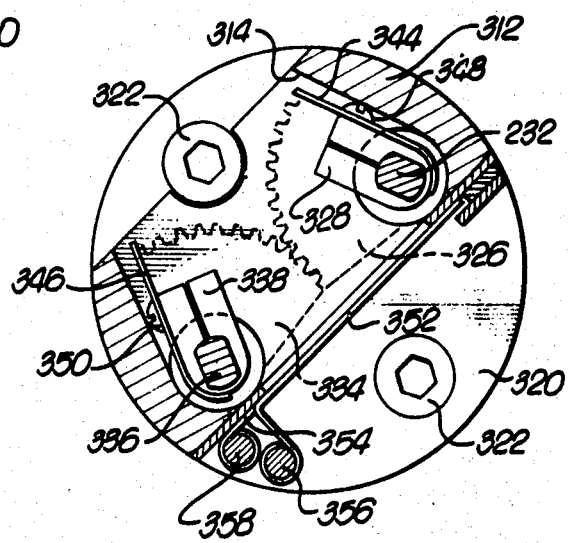
INVENTOR.
I. W. SILVERTOOTH

ELECTROMECHANICAL LIGHT VALVE SYSTEM

BACKGROUND OF THE INVENTION

In the printing of positive motion picture film from negative originals or duplicate films, it is necessary to, in some manner, control the amount of light reaching the film from the printing lamp.

A motion picture negative is composed of a number of discrete scenes, each scene being a short or long section of film which was exposed at one time and is to be printed under the same printing light conditions throughout 1The amount of increments, required to properly print one scene may differ markedly from existing amount required to print the adjacent scene, and it is necessary to make the change in exposure, or amount of printing light very quickly at the instant when the joint between scenes reaches the printing aperture, so that no portion of the following scene will be incorrectly printed with light of the amount proper for the preceding scene. There are thus two requirements on the exposure control device: it must be capable of being set accurately to provide the correct exposure over a quite large range (typically 17 to 1), in small increments, and must be able to make the change from an existing setting to the next preset setting in approximately 5 milliseconds.

One of the early methods of light control was by the use of a shutter which formed one edge of a slit, the other edge being fixed. A linkage was prepositioned by an operator during the printing of one scene, so that the position of the linkage represented the position which the shutter was required to occupy for the next scene. At the junction of the two scenes, a control signal called a cue was placed on the film, and at the detection of the cue, the shutter was caused to move under the force of a spring, from the position occupied for the first scene to the new position for the succeeding scene. This arrangement was limited in scene length by the speed with which the operator could make the presetting, and was subject to the danger of operator error.

Subsequent to this development, there was developed what is known in the industry as a "matte film,", made up of sections of film was either opaque except for transparent strips of various widths, or of various densities. This "matte film" was made in mixed scene lengths which are usually submultiples of the scene lengths, and passed in the plane of a light limiting aperture in the printer to control the light passing therethrough to expose the positive film. The disadvantages of this development are that it is not conveniently adapted to color control and it is expensive to produce and very cumbersome to store.

A third type of structure used to control light in film printers is the use of a pair of vanes arranged to open oppositely to form a slit, said vanes being controlled by a D'Arsonval galvanometer. The primary disadvantage of this structure is that the response time is very slow on the order of 30 milliseconds.

The type of structure thirdly described, and several others which make use of oppositely hinged vanes to form a slit are generally known as light valves. In most uses of light valves, the information as to the desired width of opening for each scene is stored as coded perforations in paper or other tape which indicate for each scene the setting of the aperture width for that scene. Means are provided to "read" the information from the tape for each scene while the previous scene is being printed, and to store this information in such a way that the aperture can be quickly changed to the new setting on the occurrence of a cue signal which indicates the passing of the junction between two scenes.

The density of the exposed and developed film depends on the logarithm of the exposure. It is desired to have the control of exposure operate so that the density change from one step to the next is the same for each step and quite small. This requires that the step ratio between one slit width and the next be constant, and customarily this logarithmic increment is approximately 0.025, which corresponds to a ratio of 1.06. In this type of construction, the slit width is a function of $(1 - \cos\psi)$ where $\psi$ is the angle through which the vanes are rotated from the fully closed position, and it is necessary to provide a mechanism which will cause the vanes to rotate into the desired positions to produce the desired set of slit widths, in a logarithmic scale.

The prior art teaches several ways to accomplish the desired control of the vane position. In one known form, the vanes are coupled to the coil of a D'Arsonval galvanometer, as referred to above, and a photoelectric cell is positioned so as to be illuminated by the light passing through the slit. The information punched into the paper tape is caused to control an electrical current or voltage which is compared to the voltage or current generated by the photocell, and the current in the galvanometer coil is increased or decreased under the control of the electronic control circuit until the slit width is such as to produce an illumination on the photocell to produce the indicated voltage or current. The reference current is kept constant during the printing of the scene, and is abruptly changed to the new value for new scene at the scene change cue. The disadvantage of this structure is again that the response time is relatively slow for modern printing techniques.

There is also known a light valve in which a set of solenoids are caused to move a set of linear cam elements arranged in a series to form a stack. Each linear element has two positions, in one of which it contributes and in the other does not contribute, an increment of length to the stack. The increments of length are arranged in binary succession having values of 1, 2, 4, 8, 16, and 20 units, so that by actuating any appropriate combination of linear cams, any desired sum of increments from 1 to 50 can be added to the stack. The incremental length of this stack controls the rotary position of the field coil of a solenoid. The stack length is changed under the control of the control tape during the printing of the scene, and positions the rotary solenoid in a position corresponding to the exposure required for the next scene. At the scene change cue the rotary solenoid is actuated so that its armature rotates the vanes from their position for the first scene to the position required for the second scene. The armature of the solenoid is arranged so that it will always "home" on this set position of the coil structure, as determined by the incremental length of the cam stack. A cam linkage array is interposed between the cam stack and the solenoid body to convert the linear motion of the stack in constant increments into the correct rotary position to provide the logarithmic progression of vane openings. The valves of this type have disadvantages in that they are expensive to manufacture and are subject to shock and wear which can reduce their usefulness.

SUMMARY OF THE INVENTION

It is an object of this invention to provide an electromechanical light valve for the modulation of a light bema in an additive color printer, wherein the desired steps of light valve opening increments may be fully automatic under the control of a program tape.

It is a further object of this invention to provide a mechanical "memory" which can be preset during the printing of one scene to indicate the position into which the vanes comprising the adjustable slit will be quickly rotated on the occurrence of the cue signal indicating the occurrence of the scene change in the film.

It is a further object of this invention to provide a mechanism which can receive the information from the control tape in binary form, and convert this information into a series of discrete positions of the mechanical memory which will produce the necessary logarithmic steps of opening in the shutter slit.

A Further object of the invention is to provide a mechanism which will quickly rotate the vanes which make up the slit from the position occupied during the printing of one scene to the new position required for printing the next scene, without delay or overshoot. The response time is on the order of only 5 milliseconds.

Another object is to produce an electromechanical light valve which is relatively free of distortion by shock and wear and is relatively inexpensive to manufacture.

These and other objects will become apparent from the following description and drawings, wherein:

DESCRIPTION OF THE DRAWINGS

FIG. 1 is an environmental view schematically illustrating the optical system of a conventional additive color printer with three of the improved light valves of this invention mounted therein;

FIG. 2 is a top elevational view of the improved light valve;

FIG. 3 is a cross-sectional side elevational view taken on line 3—3 of FIG. 2;

FIG. 4 is an end view of the light valve taken on line 4—4 of FIG. 3;

FIG. 5 is a cross-sectional view taken on line 5—5 of FIG. 4;

FIG. 6 is an enlarged detailed view of a trim step motor and cam assembly;

FIG. 7 is a plan view of the trim-drive code disk forming a portion of the light valve;

FIG. 8 is an enlarged detailed view of a portion of a trimming cam illustrated in FIGS. 5 and 6;

FIG. 13 is a cross sectional view of the electromechanical means for rotating the shutter means of the light valve;

FIG. 14 is a cross-sectional view taken on line 14—14 of FIG. 3;

FIG. 15 is a cross-sectional view of the actuator means for moving the shutter means, taken on line 15—15 of FIG. 14;

FIG. 16 is taken on line 16—16 of FIG. 3;

FIG. 17 is a detailed sectional view of zero cut actuator means for closing the shutter means of the light valve;

FIG. 20 is a cross-sectional view of a portion of the zero cut actuator means taken on line 20—20 of FIG. 13;

FIG. 21 is a cross-sectional detailed view of the shutter means of the light meter, taken on line 21—21 of FIG. 3;

FIG. 22 is a cross-sectional detailed view of the shutter means, taken on lines 22—22 of FIG. 3;

FIG. 23 is a figure similar to FIG. 22, showing the shutter means in an open position; and FIG. 24 is a detailed sectional view of the shutter means of the light meter, taken on line 24—24 of FIG. 1.

DETAILED DESCRIPTION OF THE PREFERRED EMBODIMENT

Figure 10:
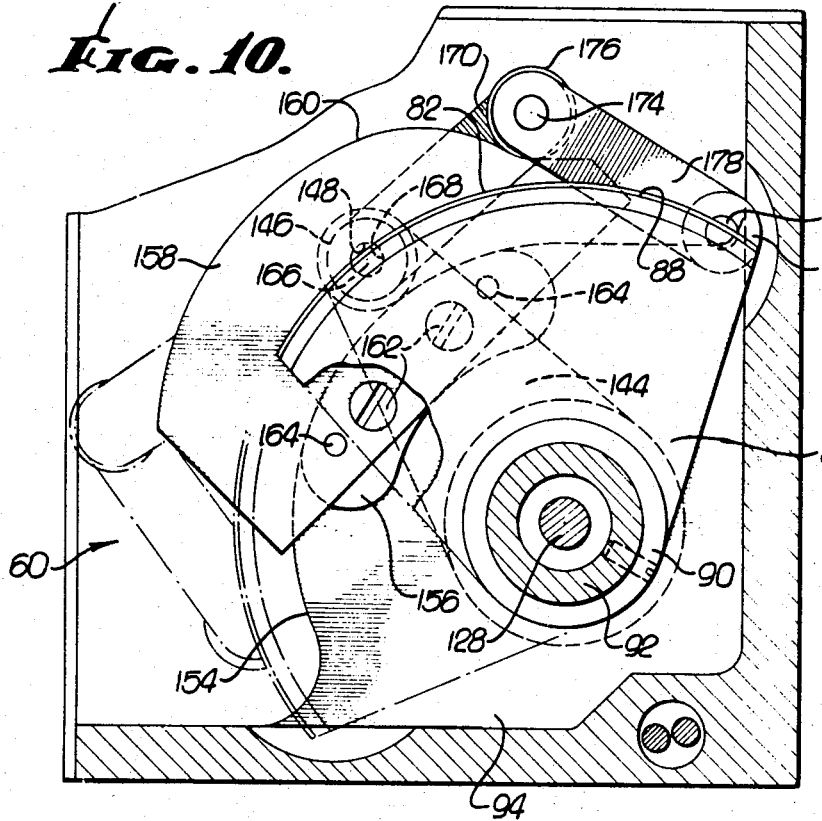
FIG. 10 is a plan view partly in section taken through line 10—10 of FIG. 3, illustrating linkage utilized with the sector and code plate means.
Figure 11:
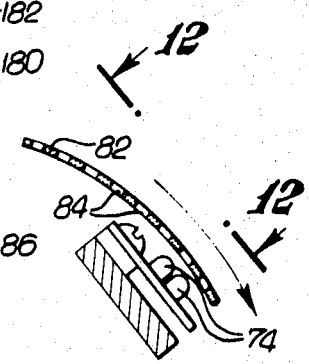
FIG. 11 is a detailed sectional view of photodiodes in association with the code plate of the light valve.

There is illustrated in FIG. 1 of the drawings a schematic representation of the optical system designated 30 of an additive color printer, which illustrates the environment of a light valve and in this case a plurality of light vales, generally designated 32.

Exterior of the printer optical system 30, there is positioned a conventional lamp and reflector 34, a pair of condensers 36 and a pair of heat glass slides 38 to remove a substantial portion of the infrared rays from the light beam positioned therebetween. A beam of light from the lamp and reflector 34 passes through the condensers, and into the system 30 which preferably includes a fader 40 and a plurality of dichroic mirrors or reflectors 42. Spaced between several of the dichroic mirrors 42 are condensers 44. The dichroic mirrors 42 are for selectively reflecting and transmitting various colors in the light spectrum, so that the light beam is split into three separate beams, one of which is predominantly red, one predominantly green, and the third predominantly blue. In each of these beams, the condensers 44 provide regions in which the light is collimated or made parallel, and in each of these collimated sections of the respective light beams is placed one of the light valves 32, all as can be seen in FIG. 1.

In each of the separately color selected light beams, the quantity of light which passes is determined by the area of the aperture of the light valve shutter opening. After the light in each beam has been controlled as to quantity, it passes to a further dichroic reflector 42, and is directed toward the printing aperture through the condenser 46, a douser 48, which may, if desired cut off all light from the film to condensers 50 adjacent to an aperture 52 over which the negative and the positive films are passed in contact, and the color positive film is exposed. The light reaching the films is the sum of the quantities of light in the three separated color beams, and by controlling the quantities of light in these three beams, the composition of the light at the exposure aperture 52 may be controlled. The sensitivity of the positive film is separated into three separate portions of the light spectrum, and the colors of the three beams in the optical system are chosen so each beam controls the exposure of one of the separated portions of the spectrum of the positive film.

In printing motion picture film, it is necessary to make changes in the intensity of the light in each of the three separate portions of the light spectrum as described above for each scene because not all scenes of the motion picture are photographed under the same conditions, nor necessarily developed under the same conditions, nor necessarily photographed on the same batch or even type of negative film. Thus, if printed under identical printing exposures, the resulting positive film would show highly undesirable variations of density and color. The control of the printing illumination then is most conveniently controlled by varying the intensity of the three separated colored beams of light in the optical system 30 as described, and recombining the three controlled beams into a composite beam to expose the positive film through the negative film at the aperture 52, to produce a properly balanced exposure of the three components of the positive film emulsion.

The light valve assembly 32 is positioned in the printer optical system 30 so that the shutter barrel means, designated 54, projects outwardly into the path of a beam of light, such as shown in phantom lines in FIG. 1, between two of the dichroic mirrors.

The light valve assembly 32 includes an elongated housing 56, including a forward actuator section 58 next to the shutter barrel means 54, and next to the actuator section 58 is the correlation means or central code plate section 60, and at the far end remote from the shutter barrel means 54 is the motor section, generally designated 62.

The entire elongated housing 56 is supported within the printer behind the printer optical system 30, where it can be readily available for repairs and adjustments.

In order to properly activate and change the positions of shutter means within the shutter barrel means 54, the light valve assembly 32 is associated with a conventional tape readout unit schematically represented by numeral 64. This tape readout unit preferably includes some form of conventional program tape reader which forms the function of reading the information from the programmed tape.

Any conventional tape reader 64 which provides an external electrical signal to indicate the presence of a hole in each of the eight possible positions transversely on the tape may be used, and the description of the tape reader is not necessary to the understanding of this invention. In the operation of the printer, the tape is advanced by the tape reader immediately at the beginning of the scene to the information for the next scene to be printed, and the information as to the presence or absence of holes in the eight channels of the tape is stored in the electrical console as open or closed switches. These switches will remain open or closed until the scene change cue has been received and acted upon by the light valves 32, whereupon the tape is advanced, and the next set of information for the next scene is read and stored.

In the usual form of tape coding, six of the channels of holes are used for storing information to control the settings of light valve shutters. One transverse column of holes controls each of the red, green, and blue light valves, respectively, and there is a blank column of holes between sets of information for each scene for convenience in reading and interpreting and controlling the tape. The columns of holes are read sequentially, and the information stored in the electronic console.

From the tape readout unit 64 an electrical cable 66 extends to and terminates in a female electrical connector 68, which in turn may be mated with a male electrical connector 70 mounted on the rear wall 72 of the light valve assembly 32.

Extending from the male electrical connector 70 to respective elements within the light valve is electrical wiring, not illustrated, to carry the electrical impulses.

Figure 9:
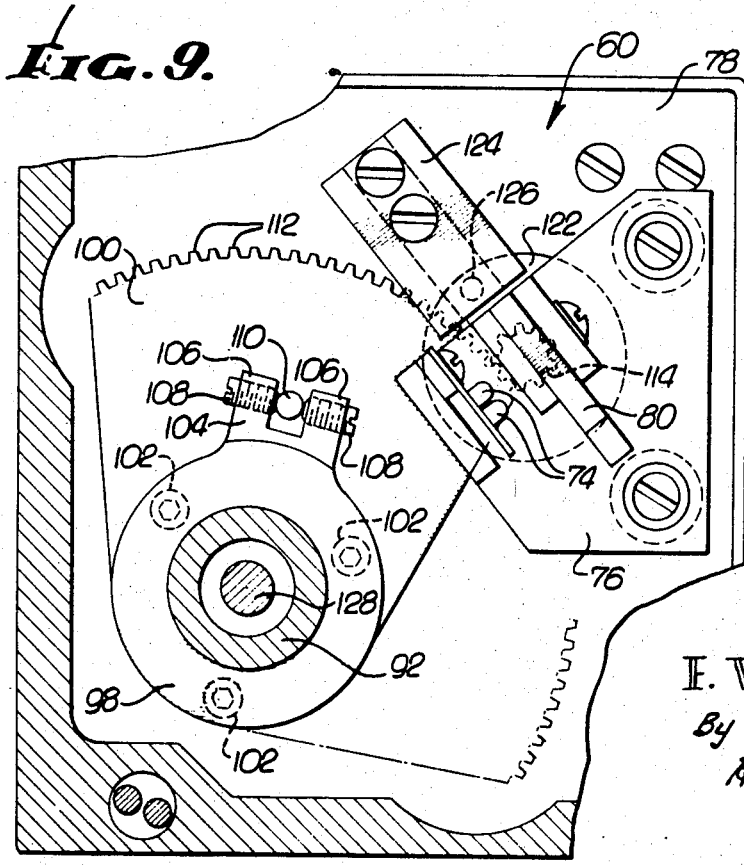
FIG. 9 is a plan view partly in section taken on line 9—9 of FIG. 3, illustrating a portion of a sector and code plate means of the light valve.
Figure 12:
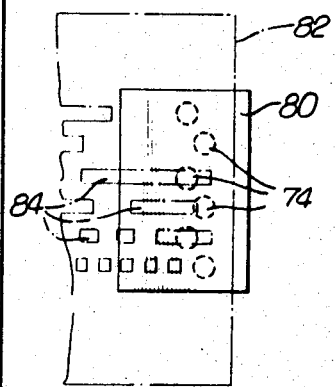
FIG. 12 is a view taken on line 12—12 of FIG. 11.
Figure 18:
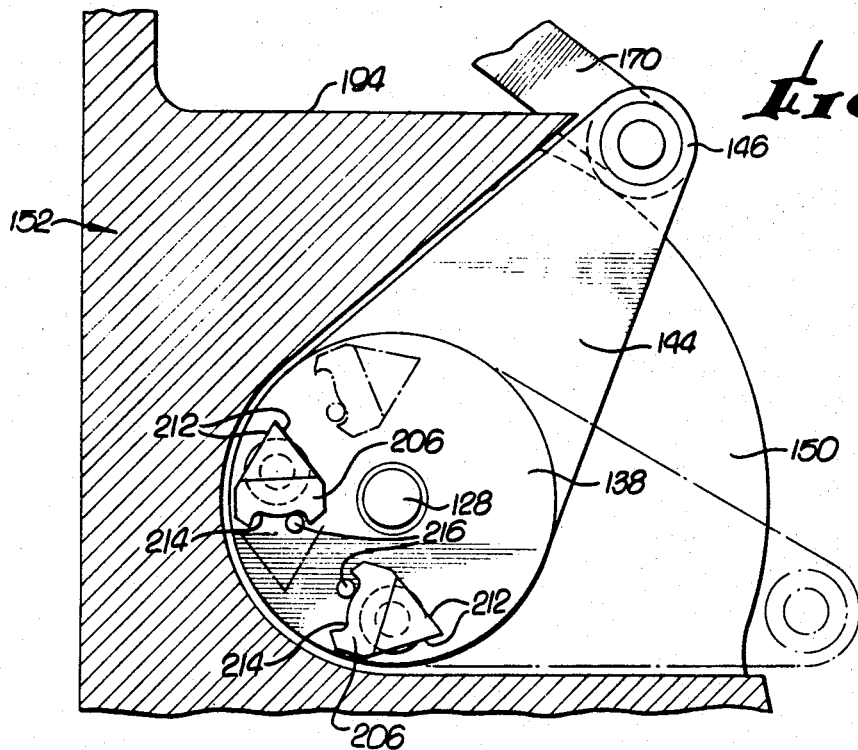
FIG. 18 is taken on line 18—18 of FIG. 13, showing further details of mechanical means for activating the shutter means.

In order to place the light valve assembly 32 in operation, the correlation means 60 includes a sensor or a series of light sources 74 (see FIG. 9) which are mounted on a bracket 76 which in turn is secured to a vertical inner wall 78 dividing the motor section 62 from the correlation means 60. Mounted above and spaced from the light sources 74 are a plurality of photoelectric cells 80, which are suspended from the bracket 76.

Suspended between the light source 74 and the photoelectric cells 80 is a preferably arcuate code plate means 82 having a plurality of rows of code openings 84, which are adapted to match the rows of punched tape openings in the programmed tape being read in the tape readout unit 64.

The code plate means 82, as best seen in FIG. 3, is suspended on a horizontal arc from a code plate sector arm 86, as can be seen in FIGS. 3 and 10. The upper surface 88 of the code plate sector arm 86 is arcuate and when the code plate means 82 is mounted thereon, it will assume the arc of the upper surface 88. The code plate sector arm 86 includes an annular bearing collar 90, which is attached to an elongated hollow shaft 92, best seen in FIG. 3. The elongated hollow shaft 92 extends from a front vertical wall 94, dividing the actuator section 58 from the code plate section 60, to the rear vertical inner wall 78. Spaced inwardly from the rearward end 96 of the elongated hollow shaft 92 is an annular mounting plate 98 extending normal to the axis of the elongated hollow shaft 92. The mounting plate 98 acts as a bearing surface for a code plate sector gear 100, best seen in FIG. 9, which is journaled on the hollow shaft 92 and held against the mounting plate 98 by means of screws 102. The annular mounting plate 98 includes an upper bifurcated adjustment extension 104 wherein the extension ears 106 are drilled too accommodate set screws 108 in opposed relationship one to the other, which are adapted to bear against an adjustment pin 110 fixed on the gear 100.

Because of the critical relationship between the gear teeth 112 on sector gear 100 and the openings in the code plate means 82, it may be necessary to rotate the sector gear 100 with respect to the elongated hollow shaft 92. In order to do this, one of the set screws 108 may be loosened and the other set screw 108 tightened so that in a vertical section line taken through the hollow shaft 92 the teeth 112 of the sector gear 100 may be shifted to the right or left of a center projection line through the shaft and the center of the adjustment pin 110 to bring the teeth 112 into the desired arcuate relationship with the openings in the code plate means 82.

Meshing with the teeth 112 of the sector gear 100 is a code plate sector drive gear 114, which is journaled on a code plate drive shaft 116, extending from a code plate stepping motor 118, which is secured to the inner vertical wall 78 by means of screws 120.

Mounted on the drive shaft 116 forwardly of the drive gear 114 is a correction signal means including a strobe disc 122 having a plurality of radially extending slots corresponding in number to the steps of the code plate stepping motor 118. Aligned with the slots, not illustrated, in the strobe disc 122 is a photoelectric cell 124, see FIG. 9, and aligned with the photoelectric cell is a light source 126, all to be subsequently explained.

Extending through the interior of the elongated hollow shaft 92 is an actuator shaft 128 suspended between bearings 130 at each end of the hollow shaft 92 and end bushings 132 retain the shaft 128 within the elongated hollow shaft 92. The shaft 128 extends forwardly through the front vertical wall 94, see FIG. 13 and is seated in a wall bushing 134, and terminates within a bore 136 of an actuator hub 138. The hub 138 is preferably tapped forming a bore 140 wherein a set screw 142 may be threadably inserted bearing against the actuator shaft 128 in order to lock the hub 138 and shaft 128 for common rotational movement.

The actuator hub 138 includes an outwardly extending link arm 144, including a boss 146 remote from said hub 138 and having a horizontal bore 148 therethrough.

The outwardly extending link arm 144 extends through an opening 150, see FIGS. 1 and 3, formed in the actuator casting 152 forming a part of the actuator means 58. The link arm 144 forms a part of the linkage means 145 which converts equal angular steps from the sector gear 100 to a constant ratio in equal area for the opening of the shutter means in a logarithmic ratio of 0.025, to be subsequently explained.

As can be seen from FIG. 2, the linkage means 145 further includes the annular boss 146 which extends rearwardly and is adapted to ride on the upper arcuate cam surface 154 of the front vertical wall 94. Secured to the front vertical wall 94 and extending rearwardly therefrom is a cam extension 156, a cam plate 158 is secured rearwardly thereof, having a cam surface 160, which on a vertical plate projects higher than the cam surface 154, as best seen in FIG. 10. The cam plate 158 is preferably secured to the cam extension 156 by means of screws 162 after the cam plate 158 is properly aligned with respect to the cam extension 156 by means of guide pins 164.

A pivot pin 166 extends through the bore 148 of the boss 146 and passes through a bore 168 in a link-arm 170. The link-arm 170 at its opposite end is formed with a pivot pin bore 172 adapted to receive a pivot pin 174, which projects rearwardly and through a cam follower roller 176. The pin 174 continues through the cam follower roller 176 into a link-arm 178, which extends from the cam follower roller 176 to a point adjacent a lug 180 formed on the upper surface 88 of the code plate sector arm 86. The lug 80 and the end of the link-arm 178 are united by a pivot pin 182.

Extending between a portion of the link-arm 178 and the code plate sector arm 86 is a tension spring 184 adapted to urge the link-arms 178 and 170 and the roller 176 downward against the cam follower roller 176 for constant engagement with the cam surface 160 of the cam plate 158.

With a description of the correlation means 60 and linkage means 145 to this point, the operation is as follows:

Upon receipt of the cue signal indicating that a scene change point has been reached in the film, the vane setting means acts to shift the vanes to the new position in a manner to be later described. Immediately on completion of this shifting of the vanes in the barrel means 54, the tape reader 64 is activated to read the four columns of information (one blank) containing the information for the next scene. The light sources 74 are emitting light beams through the code openings 84 in the code plate 82 to the photocells 80, according to whether or not there is an opening 84 in the code pattern between any given light source 74 and the corresponding photocell 80. The combination of photocells 80 which is uncovered by the openings 84 in the code plate 82 is a binary code which indicates the position of the code plate along its arcuate path. The signals from the photocells 80 are amplified and are transmitted through the plugs 70 and 68 and cable 66 to the tape read-out unit 64, and particularly to the console of electronics contained therein. The electronic circuits contained in the console, which are not a part of this invention, will compare the amplified indications from the photocells 80 with the information from the tape, as stored in the memory section of the electronics, and if the code contained in the light passed to the photocells 80 is not in agreement with the code from the tape, an electrical impulse is passed through the cable 66 to the stepping motor 118, which will be energized in the direction determined by the direction of the difference between the code as read from the code plate 82 and the code as read from the program tape, to move the shaft 116 and drive gear 114 in the proper direction to reduce the difference between the two codes. One tooth on the drive gear 114 will cause the sector gear 100 to rotate one tooth, causing the elongated hollow shaft 92 to revolve, carrying the code plate 82 one increment, and changing the code transmitted by the photocells 80 back to the electronic console. The codes are again compared, and if a difference still exists, the signal to the motor 118 is repeated, and another step advanced. When the two codes do agree, the advance of the motor 118 is halted, and current is maintained in one coil to hold the motor magnetically against any further rotation.

The strobe disc 122 on the shaft 116 of motor 118 is adjusted in rotational relationship to the steps of the motor rotation so that the slots in the strobe disc 122 will be in line to pass light from light source 126 to photoelectric cell 124 when the motor is in a stationary position, the stationary position being the position at which the current passing through the motor coils must be switched to a new relationship to cause further rotation of the motor armature. The passage of light to photocell 124 causes an amplifier to be "turned on" in the electronic console and permits the electronic control to execute the action of comparing the information from the tape with the information from the code plate 82 as indicated by the light passing through the coded openings 84. At all other times, when no slit in the strobe disc 122 is aligned with the light source 126 and the photoelectric cell 124, the comparison amplifier is inhibited from operation, and the signal to the motor 118 cannot be changed.

The process just described of stepwise advancing the motor 118 and comparing the tape information with the information from the code plate openings 84 is repeated until there is coincidence between the information from the tape and the information from the code plate 82. At this time, the shaft 116 has operated to advance the sector gear 100 carrying with it the code plate 82 and the hollow elongated shaft 92 to a position corresponding to the desired code. The coded positions of the sector gear 100 are in 50 equal increments.

It has already been said that if the vanes 344 and 346 of barrel shutter means 54 are geared together as is shown in FIGS. 21 through 24, the opening between them is a function of $(1-\cos\Phi)$ where $\Phi$ is the angle through which the vanes 344 and 346 have rotated from the fully closed position, so that it will be seen that if the angular rotation of the sector gear 100 and the code plate 82 were to be transferred directly to the vanes, without modification, the light transmission of the slit formed by the vanes 344 and 346 would follow an equation whereby the transmission would be proportional to $(1-\cos B)$ where B is the angle of rotation of the sector gear 100 from the position where the slit is fully closed. This is not the desired relationship, which is that the logarithm of the slit width be proportional to the angle of rotation of the sector gear 100 and the code plate 82. It is thus necessary to provide a means whereby the rotation of the vanes will be different from the rotation of the sector gear 100, in a relationship such that the desired logarithmic scale of slit width will be had for uniform increments of rotation of the sector gear 100.

This controlled relationship between the rotation of the vanes 344 and 346 and the sector gear 100 is provided by the linkage means 145.

The cam plate 158 controls the radial location of the cam follower roller 176, and thence controls the configuration of the four bar linkage composed of the code plate sector arm 86, the links 178 and 170, and the outwardly extending arm 144 from actuator hub 138. Moving of cam follower roller 176 toward to away from the center of rotation of shaft 128 causes the actuator hub 138 to be rotated with respect to the code plate sector arm 86. The outer arcuate surface 154 of the cam plate 158 is cut into a configuration whereby for any rotational position of the code plate 82, the dimension of the cam plate 158 is such that the configuration of the four bar linkage is controlled so that the actuator hub 138 is caused to be rotated differentially to a position which will cause the vanes in the barrel shutter means 54 to be opened or closed to a slit width which will provide the desired transmission according to the desired logarithmic scale. The major part of the rotation of the actuator hub is provided by the rotation of the sector arm 86, but a further rotation is imparted to the actuator hub 138 by the change of shape of the linkage as described to make the adjustment from the $(1-\cos\text{ine})$ law to the desired logarithmic law.

At this time, the shaft 128 and the actuator hub 138 are positioned whereby that position may be transferred by means to be described, to set the shutter means 54.

Turning now specifically to the actuator housing means 58, an actuator housing casting 152 extends between the vertical wall 94 and a forward wall 186. The casting in cross section, as best seen in FIGS. 3, 13, 14 and 16, includes a rear horizontal bore 188 and a forward horizontal bore 190. The respective bores 188 and 190 communicate with each other by means of a reduced annular bore 192.

Extending downwardly from the top surface 194 of the casting 152, are a pair of annular bores 196 and 198, each of which communicates with the respective bores 188 and 190. These bores 196 and 198 are access bores to actuator means to be described.

As can be seen from FIGS. 3 and 13, the hub portion 138 of the actuator link-arm 144 is positioned within the bore 188 adjacent the front wall 94. The hub portion 138 preferably includes two horizontally extending bores 200 adapted to receive a pawl bearing 202, through which are inserted shafts 204 from rotatable pawls 206. The shafts 204 are retained within the bearings 202 by means of clip retainers 208.

As can be seen from FIG. 14, the pawls 206 are preferably triangular shape, having two bearing surfaces 212. Each of the pawls 206 includes a rear recess opposed the bearing surfaces 214, which engage stop pin means 216 projecting from the face 210 whereby the pawls 206 can be restrained in rotational movement by means of the stop pins 216 and grooves 214.

Mounted forwardly of the hub 138 within the annular bore 188 and in alignment therewith is an annular impact damper assembly 218, including a circular casting 220 provided with a pair of horizontally extending bores 222, similar to the bores 200, which are fitted with pawl bearings 224 and pawls 226, having shafts 228 retained within the bearings 224 by means of retainer clips 230. Again, the pawls 226 are rotatable similar to the pawls 206. The casting 220 is journaled on a shutter shaft 232 and further, the casting 220 includes a damper cavity 234 and a forward damper end plate 236 secured to the casting 220 by means of screws 238. The damper cavity 234 is preferably partially filled with a granular substance, such as tungsten and the like, for reasons to be explained.

The actuator housing casting 152 is also formed with a pair of solenoid retainer bores 240 and 242, as best seen in FIGS. 14 and 16. Fitted within the bores 240 and 242 are electrically operated solenoids 244 and 246. Preferably, the solenoids 244 and 246 are secured to the casting 152 by means of screws 248 and 250 respectively.

The solenoid 244 includes an armature 252 which in FIG. 14 is extended forwardly in the bore 240. Extending inwardly from the armature 252 is an elongated solenoid plunger 254, which continues diametrically across the bore 188 and into a reduced guide bore 256. The end of the solenoid plunger 254, which is inserted in the reduced guide bore 256 is fitted with a guide plug 258 slightly less in diameter than the bore 256 to guide the rod 254 as it slides back and forth as the armature 252 is extended and withdrawn into the solenoid 244. Approximately midway between the armature 252 and the plug 258 the plunger 254 includes an enlarged collar portion 260 and mounted on the collar portion 260 is a pivotable actuator 262, having an elongated slot 264 extending therethrough. The actuator 262 is suspended around the collar 260 by means of an actuator bushing 266, which acts as a pivot pin for the actuator 262, so that it may be rotated normal to the axis of the solenoid plunger 254.

Once the code plate 82 has been properly aligned with the programmed punch tape, as read through the tape readout unit 64, the shaft 128 has been correctly positioned for the setting of the shutter means 54. At this point, it should be noted that the pawls 226 opposed to the pawls 206 may not be in direct alignment therewith, thus, it is necessary to align the pawls 226 with the pawls 206 so that the shutter shaft 232, which extends through the circular casting 220 may be rotated. In order to accomplish the alignment of the respective pawls and thus aligning the shaft 232 to the desired position, an electrical impulse passes through the cable 66 and activates the solenoid 244 wherein the armature 252 is extended inwardly toward the bore 188, so that the plunger 254 and actuator 262 will strike the pawls 206. As the pawls 206 are pivotally mounted, the respective faces 212 will be engaged by the face 268 of the actuator 262. As the solenoid plunger 254 continues inwardly the pawls 226 are also aligned with the pawls 206 because the actuator, as seen in FIG. 15, is wide enough to extend over both faces of the respective pawls 206 and 226. Once the respective pawls have been aligned by the actuator 262 moving the pawls to the desired setting, armature 252 may be deactivated and withdrawn into the solenoid 244 and the actuator 262 released from the pawls.

The annular impact damper assembly 218, as previously described, has a cavity 234 therein which is preferably partially filled with a loose material, such as tungsten, so that when the actuator 262 strikes the pawls 226, there will be an opposite reaction caused by the shifting of the weighted material within the cavity 234, thus any over rotational momentum of the assembly 218 is restricted and eliminated. In this way, the shaft 232 will not be over rotated to a setting which is not desired or which is not programmed through the programmed punched tape.

Figure 19:
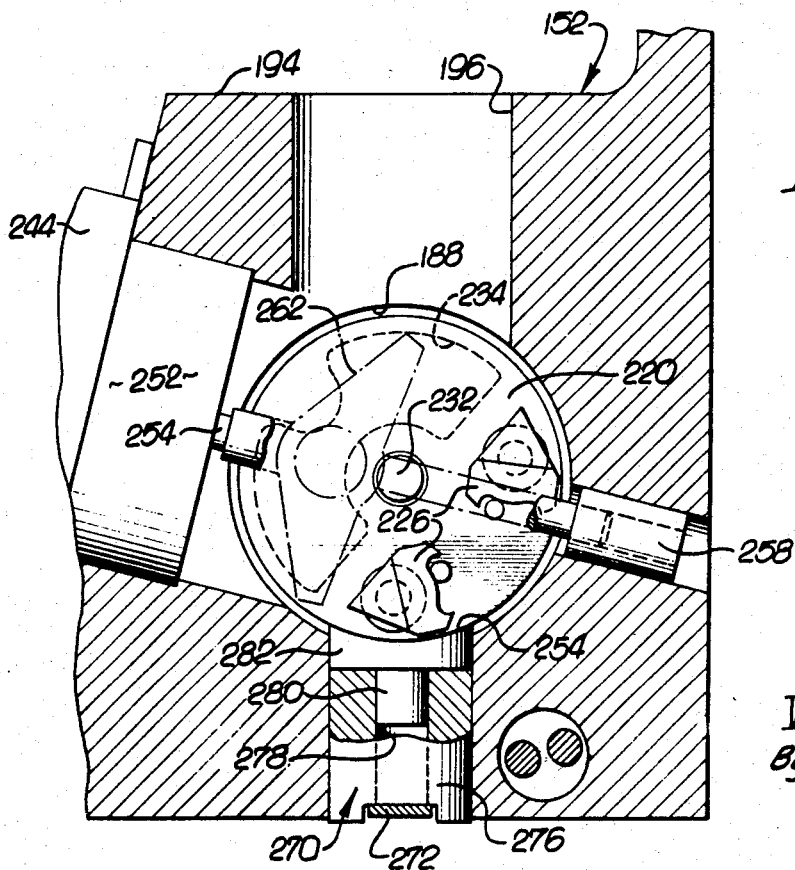
FIG. 19 is taken on line 19—19 of FIG. 13, showing the actuator means.

Additionally, there is provided a braking means, generally designated 270, as best seen in FIGS. 13 and 19, which includes a leaf spring 272 secured to the casting 152 by means of screws 274. The leaf spring 272 extends forwardly where it engages a slidable brake collar 276 mounted in bore 277. The collar 276 has a bore 278 extending therethrough into which is seated a brakeshoe stub shaft 280, secured to a brakeshoe 282 having a concave face 284 adapted to engage the outer annular perimeter of the circular rotatable casting 220.

As the leaf spring 272 is urged upwardly against the brake collar 276, the brakeshoe 282 will be constantly urged upwardly into frictional contact with the casting. After the actuator has aligned the respective pawls 206 and 226, actuator impact damper assembly 218 and the shaft 232, the assembly 218 will remain stationary until such time as a new setting is desired where the solenoid 244 is actuated to again align the pawls 226 with preset pawls 206.

The shutter shaft 232 is seated in an annular bushing 286 fitted within the reduced annular bore 192, and extends through the forward horizontal annular bore 190 and into the section generally designated as the shutter barrel means 54. Mounted within the forward annular bore 190 is the zero-cut actuator means, generally designated 288.

During the printing of color motion picture films on an additive color printer, it is sometimes desirable and necessary that some of the light valves 32 be completely closed so that a beam of light will not pass therethrough from an adjacent dichroic mirror. Thus, it is necessary that there be some means, such as the zero-cut actuator means 288, to completely override any settings of the shutter means 54, wherein the shutter will be completely closed. Such a zero-cut, as it is known in the trade, can be programmed in the tape, and thus read by the tape readout unit, whereby an impulse may be immediately sent through the cable 66 to the solenoid 246, so that the zero-cut actuator portion 290 of the zero-cut solenoid may be moved into the bore 190, and a zero-cut solenoid plunger 292, having an enlarged head portion 294, will strike a roller 296 projecting from a flat face 298 of a zero-cut locater 300.

The shaft 232 at this point has been flattened, forming two parallel sides 302 and the zero-cut locater 300 is keyed thereon.

As best seen in FIG. 17, secured to the rear vertical face 302 of the bore 190 is a stop plate 304, which is secured to the face by means of screws 306. This stop plate includes a stop surface 308 so that as the enlarged head 294 moves from a position such as shown in FIG. 17 to its closed zero-cut position, which is shown in FIG. 16, and the zero-cut locater 300 will be rotated and in turn the shaft 232 will be rotated so that the shutter means will be closed completely, allowing no light beam to pass therebetween.

In order to assure a complete keying of the shaft 232 to the locater 300, there is provided, as best seen in FIG. 20, a set screw 310, which threadably extends through the locater to the shaft 232 against one of the parallel sides 302. Thus, it can be seen that whenever it is necessary to utilize a zero-cut, solenoid 242 may be activated, which in turn will rotate the shaft 232 effecting the desired closure to the shutter means. As there is no direct attachment between the shaft 128 and 232, there is no possibility that the correlating means 60 may be accidentally moved or jarred causing misalignment of the parts.

Turning now to the shutter barrel means 54, there is provided an annular barrel extension 312, best seen in FIGS. 21 through 24, which includes a horizontally elongated opening 314 to be positioned in the path of a light beam transmitted through the printer optical system 30. The barrel 312 is capped at its exterior end by means of end cap 316, which is held to the barrel by means of screw 318 and at the opposite end by means of cap 320, wherein the screws, such as Allen screws 322, pass through the cap 320 and into the vertical wall 186 to secure it to the housing 56.

As can be seen from FIG. 24, the shaft 232 extends through a bushing 324 and is keyed to a vane sector gear 326 continuing through a pair of vane shutter clamps 328 and at its extreme end, shown in the left hand side of FIG. 24, is reduced in diameter to pass through an end bushing 330 and is then threaded into an annular bearing 332, seated within the end bearing cap 316.

Aligned with the vane sector gear 326 within the barrel extension 312, is a second vane sector gear 334 which is journaled on a vane shutter shaft 336, which extends forwardly through a pair of vane shutter clamps 338, corresponding to clamps 328, and through a bushing 340 into an annular bearing 342, similar to the bearing 332.

The respective pairs of vane shutter clamps 328 and 338 receive a pair of vane shutters 344 and 346, respectively. The vane shutters are secured to the respective vane shutter clamps 328 and 338 by means of screws 348 and 350.

Each of the sector gears 326 and 334 is meshed, such as shown in FIGS. 21 and 23, and are preferably 70° sector gears so that when the shaft 232 is rotated through the actuator means 60, as previously described, the vane shutter 344 will be cooperatively opened or closed, with the vane shutter 346 both opening and closing simultaneously from a position such as shown in FIGS. 22, where the vane shutters are in a completely closed or zero-cut position to a fully open position, such as is shown in FIGS. 23. This distance preferably represents 70°.

As can be seen from the previous description and the drawings, vane shutters 344 and 346 may be adjusted to vary the width of the opening through which the light beam may pass, but the length of the opening is constant because the length of the respective vane shutters 344 and 346 is fixed.

In order to vary the length of the opening created between the respective vane shutters 344 and 346, there is provided trim means or a pair of shutter trim plates 352 and 354, best seen in FIG. 3. These shutter trim plates 352 and 354 are reciprocal, one with the other, to move toward each other or away from each other, depending upon the longitudinal opening necessary for the passage of the light beam. The respective shutter trim plates 352 and 354 are mounted on a pair of elongated trim rods 356 and 358, respectively, which extend rearwardly from the shutter means 54 through the actuator means assembly 58 and correlation assembly 60 into the motor section 62. The trimmer rods 356 and 358 are controlled through a trim drive step motor 360, which is secured within the section 62 by means of attachment screws 362. The trim drive step motor 360 includes a shaft 364 extending out both ends of the motor. The drive shaft 364 is best seen in FIG. 4, and for the purpose of this application the front portion of the drive shaft 364 will be viewed on the right hand side of the step motor 360.

Journaled on the forwardly extending portion of the drive shaft 364 are a pair of trim cam plates 366 and 368. Each of these plates 366 and 368, as best seen in FIGS. 5 and 6, is cylindrical and the camming surfaces are provided with steps 365, as best seen in FIG. 8. Bearing against each of the respective cam trim plates 366 and 268 are cam followers 370 and 372 which reside on one of the steps 365 until the cam plates 366 and 368 are activated. Each of the respective cam followers 370 and 372 is rotationally mounted upon a pair of cam follower arms 374 and 376. The cam follower arms for the trim drive are pivotally mounted to the inner vertical wall 78, between lugs 378 by means of pivot pin 380. At the bottom extreme of the cam follower arms 374 and 378 the respective trim rods 356 and 358 are secured thereto. It is preferred that the trim rods include bushing spring means 382. Preferably there is also provided a tensioning spring means 384 to urge the cam follower arms 374 and 276 against the respective cams 364 and 366.

Thus, it can be seen that when the trim drive step motor 369 is activated in steps, the respective cams 364 and 366 will be rotated, causing the cam followers 370 and 372 and in turn the cam follower arms 374 and 376 to be moved oppositely one to the other, causing the respective trim rods 356 and 358 and in turn the shutter trim plates 352 and 354, respectively, to be moved toward or away from each other to enlarge or restrict the elongated opening once the width of the opening has been preset by means of the vane shutters 344 and 346.

The trim drive step motor 360 is preferably provided with a trim drive code disc 386, having a plurality of code openings 388 therearound. The trim drive code disc 386 is journaled on the rear portion of the drive shaft 364 and there is also provided a bank of light sources 390, similar to the light sources 74 and 126, previously described, and a photoelectric cell means 392, similar to that type previously described so that the code openings, or binary code as it is known, may be read as light from the light source 390 passes through the code openings 388 to the photoelectric cell 392. Thus, when the photoelectric cell 392 has been excited, an electric impulse will be forwarded through the cable 60 to the tape readout unit 64 and the electronic console contained therein, whereby it will be determined whether it is necessary to adjust the trim of the respective shutters, and it will also preferably appear on an indicator on the printer unit itself, which may be visibly read by the operator. Also preferably associated with the trim drive code disc is a manual trim knob which may be activated by the operator of the printer so that as the knob is turned one increment the step trim motor 360 may be activated to move one step, thereby closing or opening the respective trim shutters 352 and 354 or, of course, in the alternative, it may be completely controlled through the electronic remote readout system.

OPERATION

Once the operator has viewed a color motion picture negative and each scene thereof, he makes his computations as to the proper light intensity for the light valves 32, which are employed in a conventional color additive motion picture film printer so that he will achieve the proper intensity of the resultant film print.

The computations have been made for each scene of the motion picture, and the operator then prepares a standard program tape, with the appropriate punches, representing the incremental openings which he desires to put into each of the light valve assemblies 32 during the course of the printing of the positive motion picture print. Separately, the control personnel in the laboratory make decisions as to trim setting to allow for variations in film, processing and printer condition.

It is necessary for the operator to also provide a cue signal which will signal the beginning of each new scene in the film, requiring a new setting of the light valve assemblies 32. This "cue signal" may take the form of a notch in the edge of the film which is sensed by a roller and a switch when the film passes through the printer during the printing operation, a metallic patch which is sensed by an electronic means, or some other mark on the film; or it may take the form of a code punched into the tape to indicate for each scene change the distance from a start mark on the negative film. In this case, there is separately a measuring means on the printer which measures the distance which the film has advanced from the start mark, and determines when the distance from the start mark is equal to the distance coded into the tape.

In actual practice, it is contemplated that with the light valve 32 forming the basis of this invention, during the first portion of the time required to print a scene the tape will be advanced, and read, and the light source 74 will be activated wherein the code plate 82 will be read by the photoelectric cell 80 and in turn this information transmitted to the electronic console of the tape readout unit 64, where it will be compared with the appropriately punched tape. If there is not a correlation between the tape and the code plate 82, the stepping motor 118 may be energized, in whichever direction the plate is to move, by electrical impulses, and moved until such time as the readout of the light source through the code openings to the photoelectric cell 80 will match the punched tape for the upcoming scene. At that point, the housing 92 has been rotated through the movement of the sector gear 100 and also through the link-arm means 145, the inner shaft 128 has been moved the desired increments and the angular rotation of the sector gear 100 has been transferred to one of the preferably 50 incremental steps of the shaft 128, which in turn will move the hub 138. At his point, the pawls 206 have been rotated to the desired location so that when the scene which is presently being printed has concluded the solenoid 244 may be activated wherein the actuator 262 will align the pawls 226 of the circular casting 220, which in turn will rotate the shaft 232, imparting rotation to the respective vane sector gears 326 and 334, whereby the shutter vanes 344 and 346 will assume the desired position.

The purpose of the trim setting is to make it possible for the operator to code the control tape once and for all to take into proper account the changes between scenes in the negative, and to have the trim adjustment available to take care of the variations in film sensitivity from batch to batch, and the processing variations from day to day, so that the coded tape can always be suited to the negative film, independently of positive film and processing variations. In this way, duplicate positive prints can be made at different times and in different laboratories if necessary, without change in color balance and density from the first print.

In the event the programmed tape has called for a zero-cut to be employed at the next scene, an impulse is then directed immediately to the zero-cut solenoid 246 and the shaft 232 will be rotated so that the vane shutters 344 and 346 are in the positions, such as illustrated in FIG. 22, which are completely closed and a barrier to any light passing therethrough.

The use of programmed tape for control of motion picture printers makes possible the exact duplication of successive prints from the same negative without the possibility of operator error, and the fact that the stepping motor 118 can drive the code plate 82 to any desired position within 100 milliseconds, and the solenoids 244 and 246 can drive the shutter vanes 344 and 246 to the corresponding position within about 5 milliseconds, makes it possible to print motion picture positives from the negative at a very high linear rate, even though there is a large plurality of scenes, each requiring a different exposure to each of the three colors of light which make up the printing beam at the exposure aperture.

While the present invention has been described as primarily relating to use with a color additive motion picture printer, it should be realized that a single light valve assembly 32 may be equally utilized within a conventional black and white film printer, without departing from the spirit of the invention.

I claim:

1. The combination of: a light source, a light valve receiving light from said source and adapted to modulate in minute increments light output therethrough, an electromechanical device embodying light intensity programming coupled with said light valve to control and actuate the latter, an electronic memory storage system containing light intensity settings in code, means electrically coupling the memory storage system to the electromechanical device to transmit to the memory storage system in corresponding code the light intensity programming of the electromechanical device, and to transmit a readout from the memory storage system back to the electromechanical device any correction necessary to comply with the readout, said electromechanical device embodying means responsive to said readout of the memory storage system for coordinating actuation of the light valve by the electromechanical device in exact accordance with the readout.

2. The combination as defined in claim 1, wherein the electromechanical device includes code plate means mounted for incremental arcuate rotation, and a stepping motor linked to said code plate means to rotate said code plate means when energized to comply with said readout.

3. The combination as defined in claim 2 wherein mechanical linkage means are provided between said code plate means and said light valve whereby said light valve may be adjusted to modulate light output therethrough.

4. The combination as defined in claim 2 wherein said light valve includes a shutter formed by a pair of reciprocating vanes, a shutter shaft means adapted to move said vanes independent of said code plate means.

5. The combination as defined in claim 4 wherein said electromechanical device includes actuator means to engage and align said shutter shaft means to the preselected light intensity readout and will disengage upon alignment whereby said electromechanical device can be reactivated to another light intensity setting upon command.

6. An automatic light control as a component in a motion picture film additive color printer comprising: an electronic memory storage system and tape readout programmed with a code representing preselected light intensity settings, a light valve adapted to be sequentially adjusted in accordance with the intensity settings of the program, and correlation means adapted to electromechanically translate the said programming into corresponding light intensity settings of the light valve, the correlation means including a sensor responding to signals from the system accepting the correlation means setting or signaling the system that correction of the setting is required, the system including a correction signal means actuating the correlation means to change the setting of the latter to correspond with the readout program.

7. An automatic light control as a component in a motion picture film additive printer comprising: an electronic memory storage system and tape readout programmed with a code representing preselected light intensity settings, a light valve adapted to be sequentially adjusted in accordance with the intensity settings of the program, and correlation means adapted to electromechanically translate the said programming into corresponding light intensity settings of the light valve, including code means, a rotatable correlation shaft adapted to be rotated by said code means, a correlation hub means axially aligned with said correlation shaft and proportionally rotatable relative to the rotation of said correlation shaft; linkage means interconnecting said code means and said correlation hub means and adapted to maintain said hub means against rotation when said hub means is rotationally set; a stepping motor connected to said correlation means adapted to be actuated and change the setting of said correlation means to correspond with the readout program; a rotatable light valve shaft axially aligned with said correlation hub means and independent thereof, said light valve shaft being connected to said light valve, and actuator means interposed between said correlation hub means and said light valve shaft activatable through said system to rotationally align said light valve shaft with said correlation hub means to achieve a preselected light intensity setting.

8. An automatic light control as defined in claim 7 wherein said code means includes a code plate having code openings therein and journaled on said correlation shaft for movement through an arc, and light impulse means associated with said code plate openings adapted to respond to signals from said system.

9. An automatic light control as defined in claim 8 wherein said code means includes a sector gear imposed between said code plate and said correlation shaft adapted to be driven by said stepping motor.

10. An automatic light control as defined in claim 7 wherein said light valve includes shutter means.

11. An automatic light control as defined in claim 10 wherein said shutter means include a pair of reciprocally arcuately rotatable vanes, a pair of sector gears in meshing relationship having one of said pair of vanes mounted on each sector gear, and one of said gears being journaled on said light valve shaft.

12. An automatic light control as defined in claim 7 wherein said actuator means includes a solenoid and plunger activatable by said system wherein said plunger will strike and rotationally align said light valve shaft with said fixedly positioned correlation hub means.

13. An automatic light control as defined in claim 12 wherein said light valve shaft includes a shaft hub means axially aligned with and spaced from said correlation hub means and each of said hub means include opposed pivotally mounted palls engageable by said plunger to create rotational alignment of said light valve shaft with said fixedly positioned correlation hub means.

14. An automatic light control as defined in claim 7 wherein said linkage means includes a plurality of interconnected pivotal link arms and cam follower rollers; a plurality of cam surfaces spaced longitudinally axially from each other and engaged by said cam follower rollers whereby angular rotation of said correlation means will impart a reduced proportional angle of rotation to said correction hub means.

15. An automatic light control as defined in claim 7 wherein there is included a zero-cut actuator means activatable through said system and adjacent said light valve shaft adapted to engage said light valve shaft and rotationally move said shaft whereby said light valve is closed.

16. An automatic light control as defined in claim 13 wherein a damper assembly is provided which is adapted to exert a force in a direction opposite to the direction of rotation of said light valve shaft hub means and prevent overrotation of said hub.

17. An automatic light control as defined in claim 7 wherein breaking means are provided to engage said light valve shaft hub means to retain said latter means in a fixed position upon rotational alignment with said correlation hub means.